(12) United States Patent
Traub et al.

(10) Patent No.: US 7,108,901 B2
(45) Date of Patent: Sep. 19, 2006

(54) SHIM

(75) Inventors: Darren Traub, Irvine, CA (US);
Arthur Wagner, Geneva, IL (US);
Jerry W Crews, Los Alamitos, CA (US)

(73) Assignee: Fibertech Polymers, Inc., Santa Ana, CA (US)

( * ) Notice: Subject to any disclaimer, the term of this patent is extended or adjusted under 35 U.S.C. 154(b) by 83 days.

(21) Appl. No.: 10/783,320

(22) Filed: Feb. 20, 2004

(65) Prior Publication Data

US 2005/0186395 A1    Aug. 25, 2005

(51) Int. Cl.
*B32B 3/30*    (2006.01)

(52) U.S. Cl. .......................... 428/43; 428/81; 428/167; 52/98

(58) Field of Classification Search .................. 428/43, 428/81, 167, 156, 119; 52/98, 126.1, 126, 52/125.1; 248/188.2
See application file for complete search history.

(56) References Cited

U.S. PATENT DOCUMENTS

| | | | |
|---|---|---|---|
| 2,772,596 A | 12/1956 | Trussell | |
| 4,232,068 A | 11/1980 | Hoh et al. | |
| 4,281,302 A | 7/1981 | Stegens | |
| 4,526,641 A | 7/1985 | Schriever et al. | |
| 4,731,965 A | 3/1988 | Jensen | |
| 4,830,320 A * | 5/1989 | Bellows | 248/188.2 |
| 5,054,250 A | 10/1991 | Foss | |
| 5,163,255 A | 11/1992 | Gamba | |
| 5,249,767 A * | 10/1993 | Mellen | 248/188.2 |
| 5,853,838 A | 12/1998 | Siems et al. | |
| 5,953,862 A | 9/1999 | Earhart et al. | |
| 6,018,916 A | 2/2000 | Henry | |
| 6,230,446 B1 | 5/2001 | Chalich | |
| 2002/0157328 A1 | 10/2002 | Holder | |

* cited by examiner

*Primary Examiner*—Alexander S. Thomas
(74) *Attorney, Agent, or Firm*—Orrick, Herrington & Sutcliffe LLP

(57) ABSTRACT

Shims comprising a mixture of plastic and natural fibers originating from wet processed cellulose fiber based waste source material include an elongate body that tapers down from a thick end to a thin end. A series of ridges and grooves or valleys are formed in at least one face of the body traversing the width of the body from a point adjacent the thick end to a point beyond the longitudinal mid-point of the body. The base of the valleys each form individual break lines preferably spaced apart at predetermined intervals. A raised rim or ridge preferably extends about the outer boundaries of the face in which the ridges and grooves are formed.

16 Claims, 5 Drawing Sheets

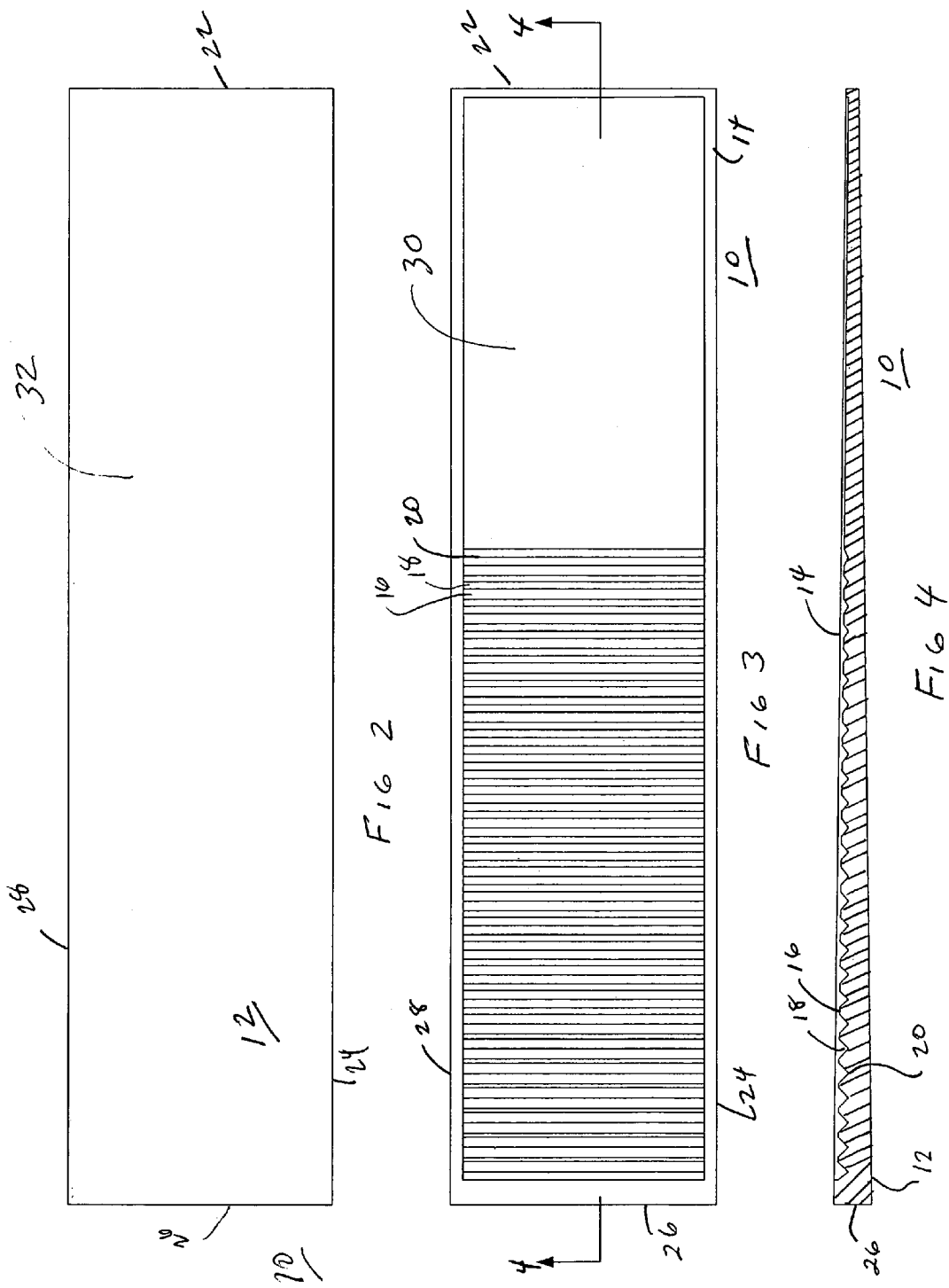

SHIM

FIELD OF THE INVENTION

The present invention relates generally to non-wood shims and, more particularly, to non-wood shims including natural fibers originating from waste source materials.

BACKGROUND OF THE INVENTION

Shims or wedges, tapered work-pieces, and the like, are well known and widely used in the construction of homes, buildings, furniture and the like, to raise, align, square up and fill gaps of windows, doors and other building components. Traditionally, shims have been formed out of wood and often simply crafted out of scrap pieces of wood. To provide a ready supply of shims, wooden shims have been manufactured by the bundle.

Other attempts at providing a ready supply of shims include the manufacture of synthetic shims. Such shims however tend to be formed primarily from plastic, which tend to be more pliable and, thus, more difficult to break or snap off at a desired length.

In an effort to improve the mechanical properties of other synthetic household and industrial products, building materials and the like, these products have been manufactured using polymers or plastics reinforced with a variety of fillers. By compounding in mineral fillers such as calcium carbonate, talc, mica and wollastonite and synthetic fillers such as glass, graphite, carbon and Kevlar fibers, as well as natural fibers, such as cellulose fiber, some mechanical properties of polymers or plastics are vastly improved. The cellulose fiber used to reinforce polymers or plastics has typically included wood flour or ground wood fiber having an effective mesh size of about 10 to 60 mesh. Use of such cellulose fiber fillers tends to have many drawbacks as a result.

For instance, because of low bulk density and the need for pre-drying before or during compounding, processing with wood flour or ground wood fiber tends to results in low production rates and high costs. The powdery consistency of such fillers not only results in a messy operation, but tends to pose potential health risks to those manning the processing. Wood flour and ground wood fiber also tend to cause blocking or agglomeration due to the material packing together and tend to be extremely difficult to convey and feed into an extruder, the inlet of which is typically small relative to the low bulk density of these materials.

Further, the use of ground wood fiber or wood flour as the raw material for forming cellulose fiber-polymer pellets or directly forming cellulose fiber enhanced polymer materials or products, tends to be quite costly. Other sources of more cost-effective cellulose fiber based raw materials have tended to be over looked due to the industry's focus on ground wood fiber or wood flour as the preferred raw material. For example, materials found in the waste streams of most paper mills could provide an abundant supply of processed cellulose fiber. Today, paper mills discard millions of tons per year of processed cellulose fiber along with other materials such as plastics and/or inorganics that are not suitable for use in the paper making process. To date, this source of substantially wet waste cellulose material has not been tapped as a manufacturing fiber source and, particularly, as a fiber source for the manufacture of non-wood shims.

Thus, it is desirable to provide an improved non-wood shim and, particularly, a non-wood shim comprising natural fibers, and a process by which such non-wood shims can be manufactured using a wet waste processed cellulose fiber based source material.

SUMMARY OF THE INVENTION

The present invention is directed to improved, non-wood shims. In a preferred embodiment, the shims comprise a mixture of plastic and natural fibers originating from wet processed cellulose fiber based waste source material. The fiber advantageously reduces the impact strength of the shim, increasing its brittleness and allowing for easier and quicker breaks of the shim. Preferably, the shim comprises plastic in a range of about 66% to 75% by weight, and preferably about 71% by weight, fiber in a range of about 22% to 29.5% by weight, and preferably 25% by weight, and residual additives, including about 2% by weight coupling agents, about 1.25% by weight lubricants, and about 0.75% by weight stabilizers.

This mixture of plastic and fibers is preferably formed into an elongate body that tapers down from a thick end to a thin end. A series of ridges and grooves or valleys are formed in at least one face of the body traversing the width of the body from a point adjacent the thick end to a point beyond the longitudinal mid-point of the body. The base of the valleys each form individual break lines preferably spaced apart at intervals of about 3/16 inches. A raised rim or ridge preferably extends about the outer boundaries of at least face in which the ridges and grooves are formed. The rim tends to reduce that tendency of the ridges to catch during insertion of the shim into a workpiece to be shimmed.

The shims are manufactured in a traditional injection molding process. The preferred fiber source, preferably in the form of polymer enhanced cellulose fiber pellets ("fiber source"), is preferably dried to reduce moisture content in the fiber source to below 0.1% by weight. The fiber source is then combined with thermoplastic material and mixed to create a uniform mixture, which is then introduced into a feed hopper of an extruder, or mixed in the feed hopper of the extruder. The extruder feeds the raw materials through the extruder barrel melting the thermo plastic and creating a homogenous melt that is then injected under controlled temperature and pressure into a mold. Once cooled, the shims are removed from the mold.

The fiber source is preferably formed from a mixture of cellulose fiber pellets, thermoplastics and commonly used additives. Preferably, the fiber source includes about 60% to 70% by weight cellulose fiber pellets, which comprise between about 10% to 20% by weight of mixed plastics. The balance of the fiber source is about 26% to 36% by weight polyolefin thermoplastics having a melt flow rate (MFR) of about 25 to 35 g/10 minutes, and about 4% by weight commonly used additives.

Preferably, the cellulose fiber pellets are produced from wet processed cellulose fiber-based raw material in an extruder-less process. The processed cellulose fiber based raw material is preferably sourced from paper sludge and other reject streams from one or more stages of production at paper mills. This waste stream material typically comprises a mixture consisting primarily of processed cellulose fiber and mixed plastics and/or inorganics such as minerals, clay, and the like. The mixed plastics typically include one or more polyolefins, such as but not limited to polyethylene, polypropylene, and polystyrene. The moisture content of this waste stream material tends to be about 40 to 80% by weight and the weight by weight ratios of cellulose to plastics and/or inorganics tend to be in a range of about 99 to 1% to 60 to 40%.

The extruder-less process comprises receiving and drying a wet processed cellulose fiber based source material, grinding the dried material, and then pelletizing the dried, ground material. Preferably, commercially available drying systems and processes may be used to dry the source material of cellulose and mixed plastics and/or inorganics having a moisture content in the range of about 40 to 80% by weight to a moisture content of about 0.1 to 14.0% by weight and, most preferably, to about 1.0 to 5.0% by weight. The grinding step may be accomplished using commercially available shredders or granulators, ball mills and/or hammer mills to grind the material comprised of cellulose and mixed plastics and/or inorganics down to a particle size in an effective mesh range of about 10 to 60 mesh. Depending upon the source of the fiber and the extent and type of the grinding carried out, the aspect ratio of the cellulose fiber can be in the range of 10:1 to 300 to 1. Lastly, the pelletizing step, which may comprise compaction, pelletization and/or densification may be accomplished using commercially available screw presses, pellet mills, and/or compacting presses to compact the dried and ground source material and form pellets. Preferably the source material is compacted from a bulk density of about 1 to 10 pounds per cubic foot to a bulk density in a range of about 12 to 50 pounds per cubic foot and, preferably, in a range of about 20 to 40 pounds per cubic foot, and then forming pellets having length and/or diameter dimensions in a range of about 1/16 inches to 2 inches and, preferably, in a range of about 1/8 inches to 1/2 inches.

Further, objects and advantages of the invention will become apparent from the following detailed description and accompanying drawings.

BRIEF DESCRIPTION OF DRAWINGS

FIG. 2 is a plan view of the bottom face of the shim shown in FIG. 1.

FIG. 3 is a plan view of the top face of the shim shown in FIG. 1.

FIG. 4 is a cross-sectional view of the shim shown in FIG. 3 take along line 4—4.

DETAILED DESCRIPTION OF PREFERRED EMBODIMENTS

Figure 1:
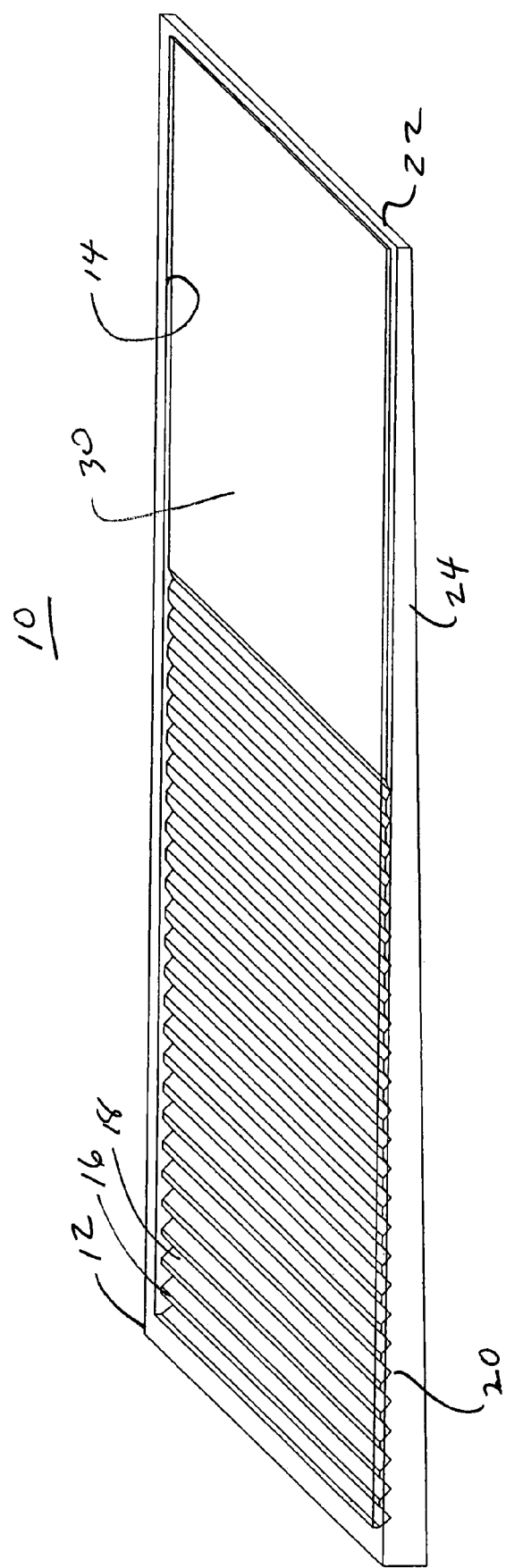
FIG. 1 is a perspective view of a shim of the present invention.

The present invention is directed to improved, non-wood shims comprising polymers and natural fibers such as cellulose fiber originating from wet processed cellulose-based waste source materials. Turning to FIGS. 1–4, a shim 10 in accordance with the present invention, which may vary in length, width, and thickness, is shown to have a generally wedge shaped body 12 that tapers along its longitudinal axis from a thick end 26 to a thin end 22. The body 12 comprises a top face 30 and a bottom face 32 having generally rectangularly shaped profiles defined by parallely disposed side walls 24 and 28 and end walls 26 and 22. The top face 30 includes a series of ridges 16 and grooves 18 formed in the body 12. The ridges 16 and grooves 18 substantially traverse the width of the face 30 and extend from a point adjacent the thick end 26 to a point generally beyond the longitudinal mid-point of the face 30. The base of the grooves 18 preferably form break lines 20 which are evenly spaced from one another at a distance of about 3/16 inches.

A raised rim 14 or ridge preferably extends about the outer boundaries of at least the top face 30 of the shim 10. The rim 14 provides the shim 10 with a smooth surface that tends to prevent the ridges 16 from catching during insertion of the shim 10 into a work piece to be shimmed. Alternatively, the ridges 16 and grooves 18 may be recessed from the surface of the top face 30 resulting in a rim 14 that extends about the ridges and grooves 16 and 18 and has a surface that is contiguous with the surface of the rest of the top face 30.

The shim 10 is preferably comprised of a mixture of polymer and natural fibers such as cellulose. The fiber advantageously reduces the impact strength of the shim 10, increasing its brittleness and allowing for easier and quicker breaks of the shim 10. The fiber/polymer mixture of the shim 10 includes 50% by weight of a preferred fiber source ("fiber source"), which comprise polymer enhanced fiber pellets as discussed in greater detail below, and 50% by weight of a polymer, preferably a polyolefin thermoplastic or the like. The polyolefin thermoplastics preferably include Polypropylene and Polyethylene. The thermoplastic material can be reground or virgin material with a Melt Flow Rate (MFR) that is appropriate for injection-molded parts. The preferred MFR range for the thermoplastic used for the shims of the present invention is about 25 to 35 g/10 min.

The fiber source preferably includes between 60% and 70% by weight cellulose fiber pellets; with the balance including a mixture of polyolefin thermoplastic carrier resin, about 36% to 26% by weight, and about 4% by weight commonly used additives. The cellulose fiber pellets preferably have between about 10% and 20% by weight mixed plastics. The vast majority of the mixed plastics in the cellulose fiber pellets is Linear Low and Low Density Polyethylene (LLDPE & LDPE) and can account for as much as 90% by weight of the mixed plastic. Other contaminants in the cellulose fiber pellets may include Nylon, Polyvinyl Chloride (PVC), Polystyrene (PS), Acrylonitrile-butadiene-styrene (ABS), and poly (ethylene terephthalate) (PET). As a result, the shim preferably contains plastic in a range of about 66% to 75% by weight and more preferably about 71% by weight, fiber in a range of about 22% and 29.5% by weight and more preferably 25% by weight, and residual additives as processing aids, including about 2% by weight of a coupling agent, about 1.25% by weight of lubricants, and about 0.75% by weight of stabilizers.

Unlike wood shims that have a high equilibrium moisture content that will change as the local relative humidity changes, the shim 10 tends not be affected by changing relative humidity to the same, or even near same, extent. This is due to the shim 10 behaving like plastic, which has a low equilibrium moisture and is hydrophobic and, thus, has a low affinity for moisture.

By adding fiber to the thermoplastic material, the flexural modulus of the shim 10 is increased, which increases stiffness. More importantly, adding fiber reduces the impact strength of the shim 10 increasing the brittleness and allowing the part to break (snap) more easily and cleanly. Although deformable, such that it tends not to return to its flat shape once bent, the shim 10 will only deform to a predetermined or limit point before it cleanly breaks or snaps off along one of its break lines 16.

With the rim 14, the shim 10 advantageously has two faces with smooth surfaces that allow shim 10 to be inserted into gaps without catching or causing damage to the adjacent surfaces of the work pieces. Even in the area of the shim 10 that has the ridges 16 and grooves 18, the rim 14 allows a continuous smooth surface to interact with the adjacent surface of the work piece being shimmed.

The grooves 18 provide defined and incremental cleavage points or break lines 16 that eliminate the requirement for scoring the shim 10 to achieve a perfect break. In addition, the shim 10 is preferably maintained at a constant thickness at the base of each groove 18 which tends to maintain the force required in snapping the shim 10 at all cleavage points at a constant level.

Due to the composition of the shim 10, it tends not to split or splinter when penetrated by a nail or the like, nor is it subject to rot or to bug infestation, or the like.

Figure 6:
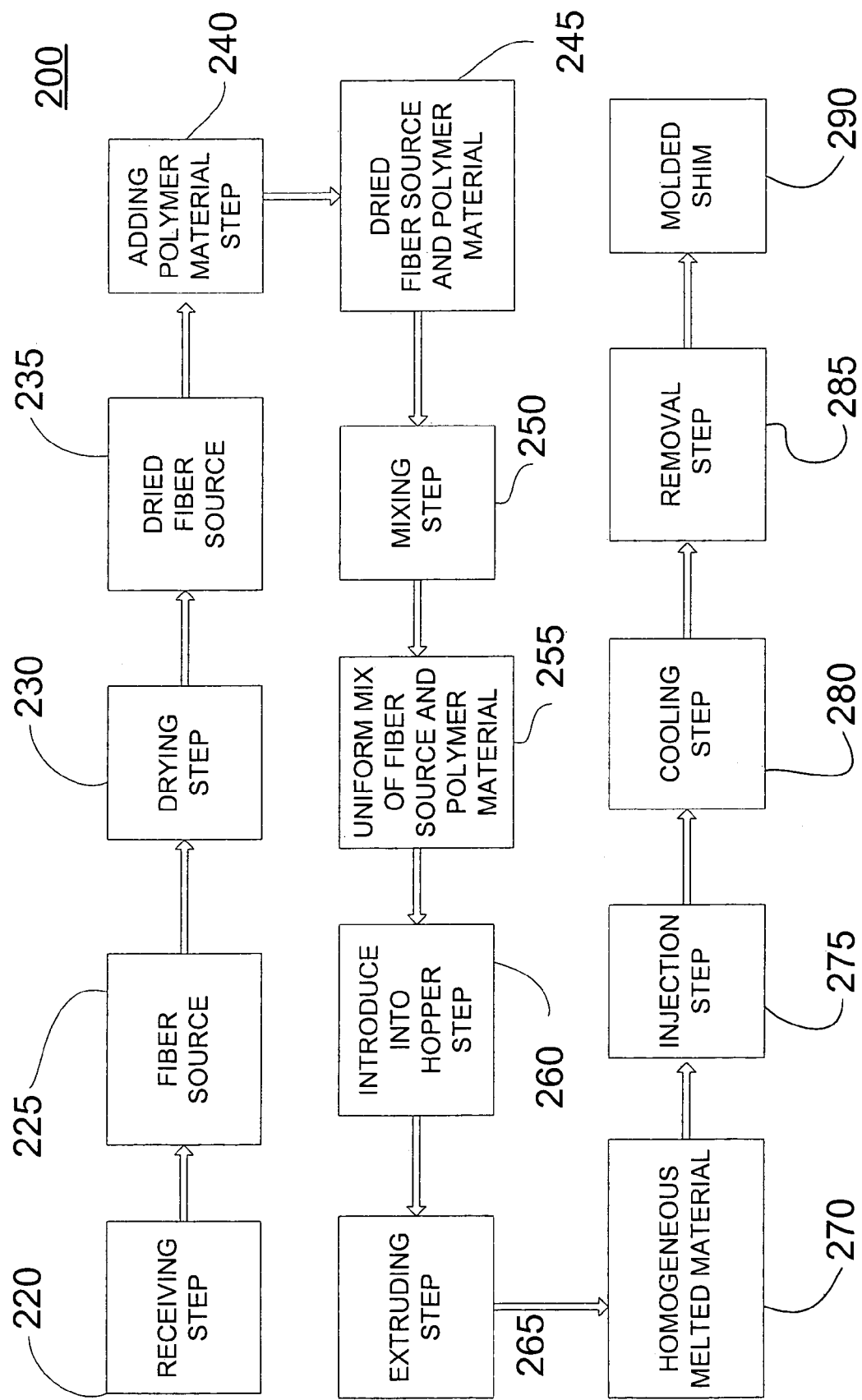
FIG. 6 is a flow diagram of a process used to form a shim of the present invention.

As shown in FIG. 6, the shims 10 are manufactured in a traditional injection molding process 200. A fiber source 225, in the form of polymer enhanced cellulose fiber pellets, is received at step 220 and dried at step 230 preferably in a thermal desiccant dryer to reduce the moisture in the pellet to below 0.1%. The dried fiber source 235 is then added at step 240 to a mixture of thermoplastic in the correct ratio described above. The dried fiber source and thermoplastic mixture 245 are thoroughly mixed at step 250 preferably by hand or in a ribbon blender or similar mechanical mixing machine to create a uniform mixture of fiber and thermoplastic material 255. The uniform mixture 255 is then introduced at step 260 into the feed hopper of an extruder. At step 265, the extruder feeds the raw materials through the extruder barrel melting the thermoplastic and creating a homogenous melt 270 that is then injected at step 275 under controlled temperature and pressure into a shim mold. Once cooled at step 280, the material is removed at step 285 from the mold allowing extraction of the shims 290. The finished shims 290 are then packaged and labeled.

Figure 5:
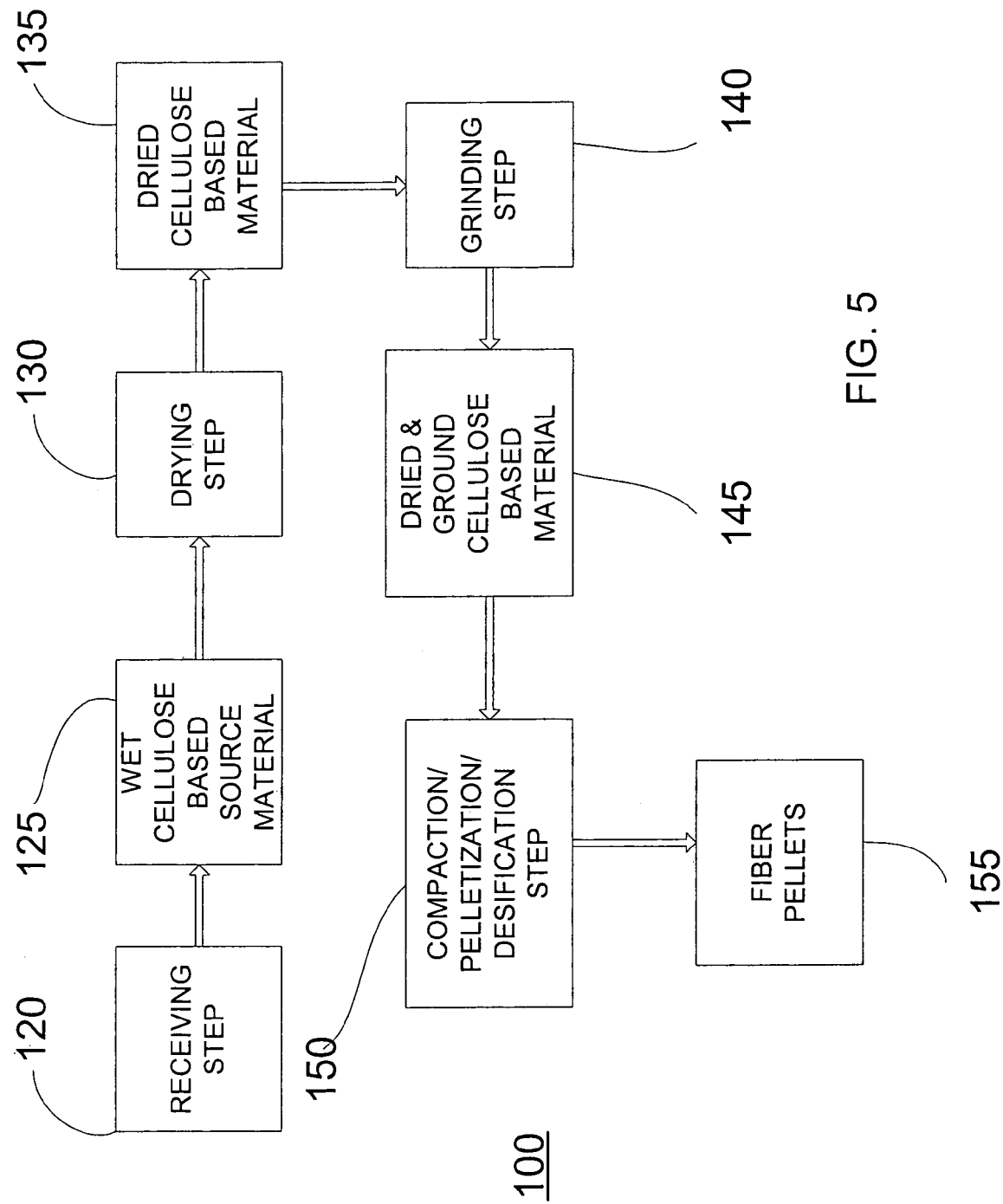
FIG. 5 is a flow diagram of a process used to form a cellulose fiber-based pellet from a wet waste source of cellulose fiber-based materials.

As FIG. 5 depicts, the cellulose fiber pellets 155 are produced from a wet processed cellulose fiber-based raw material 135 as described in greater detail in U.S. patent application Ser. No. 10/109,816, which is incorporated herein by reference. This raw material 135 is preferably sourced from paper sludge and other reject streams, including primary and secondary reject streams, from one or more stages of production at paper mills. The reject streams include material that is rejected at each stage as unsuitable for use in the paper making process and typically finds it way to a landfill. The waste material generally comprises a mixture consisting primarily of processed cellulose fiber and mixed plastics, including one or more polyolefins, such as but not limited to polyethylene, polypropylene, and polystyrene, and/or inorganics such as minerals, clay, and the like. However, the amount of paper sludge, waste fiber, plastics and inorganics in such reject streams varies tremendously depending upon the type of product produced at the paper mill. This can vary in terms of the proportion of cellulose fiber to inorganics and to mixed plastics. For example in a coated paper mill, which glossy paper for magazines is produced, mineral content could be as high as 40% by weight (based on total solids) with virtually no plastics at all. On the other hand, an old corrugated cardboard (OCC) recycled paper mill, which uses several steps to recover long cellulose fiber to include in the paper making process, could have waste material with inorganic content from 0 to 15% by weight and plastics content from 2% to 30% by weight, depending upon the efficiency of the fiber recovery process at that paper mill. There are, however, lots of variants in between these examples for other paper mills for office paper, bleached board for milk cartons, bleached board for ovenable TV dinners, non-recycled Kraft paper for corrugated or brown bags, tissue paper and the myriad of paper products. Thus, the weight by weight ratios of cellulose to plastics and/or inorganics tend to be in a range of about 99 to 1% to 60 to 40%, while the moisture content tends to be in a range of about 40 to 80% by weight for such waste material.

As shown in FIG. 5, the extruder-less pellet fabrication process 100 comprises a receiving step 120 for receiving and introducing the wet cellulose based raw material 125 into the process 100. The receiving step is followed by a drying step 130 to dry cellulose-based raw material 125. After the drying step 130, a grinding step 140 is used to reduce the size of the dried cellulose based material 135. The grinding step 140 is then followed by a compaction, pelletization and/or densification step 150 used to compact the dried, ground material 145 and form fiber pellets 155.

The drying step 130 of the present invention may be accomplished with a variety of drying processes and commercially available drying systems known to one skilled in the art such as rotary, fluidized bed, flash, or cyclonic dryers. Preferably, the drying step 130 of the present invention is accomplished using a drying system described in U.S. Pat. Nos. 5,915,814 or 5,7891,066, the disclosures of which are incorporated by reference. The drying step 130 is used to dry the raw material 125 to a moisture content of about 0.1 to 14.0% by weight and, most preferably, to about 1.0 to 5.0% by weight. The starting moisture content of the raw material 125 is typically in a range of about 40 to 80% by weight when is introduced into the process 100. If screw presses are used, the moisture content would typically be reduced to about 40% prior to entering the drying system.

Like the drying step 130, the grinding step 140 may be accomplished with a variety of grinding processes and commercially available grinding systems known to one skilled in the art such as commercially available shredders or granulators, ball mills and/or hammer mills. Depending on the specific application, the grinding step 140 would be used to grind the dried cellulose and mixed plastics and/or inorganics material 135 down to a particle size in an effective mesh range of about 10 to 60 mesh. Depending upon the source of the fiber and the extent and type of the grinding carried out, the aspect ratio of the cellulose fiber can be in the range of 10:1 to 300 to 1.

The compaction, pelletization and/or densification step 150, like the drying and grinding steps 130 and 140, may be accomplished with a variety of densifying and pelleting processes and commercially available screw presses, pellet mills, and/or compacting presses know to one of skill in the art. The purpose of this step 150 is to densify, preferably with a pellet mill, the dried and ground material 145 from a bulk density of about 1 to 10 pounds per cubic foot to a bulk density in a range of about 12 to 50 pounds per cubic foot and, preferably, in a range of about 20 to 40 pounds per cubic foot. The densified material is then pressed through a die at temperatures as high as about 300° F. (177° C.), and preferably about 250° F. (121° C.), and cut into cellulous fiber pellets 155 having a generally cylindrical geometry with length and diameter dimensions in a range of about 1/16 inches to 2 inches and, preferably, in a range of about 1/8 inches to 1/2 inches. The plastic and/or inorganic content tends to melt below this temperature to bind the cellulose fibers and provide integrity to the fiber pellets.

Figure 7:
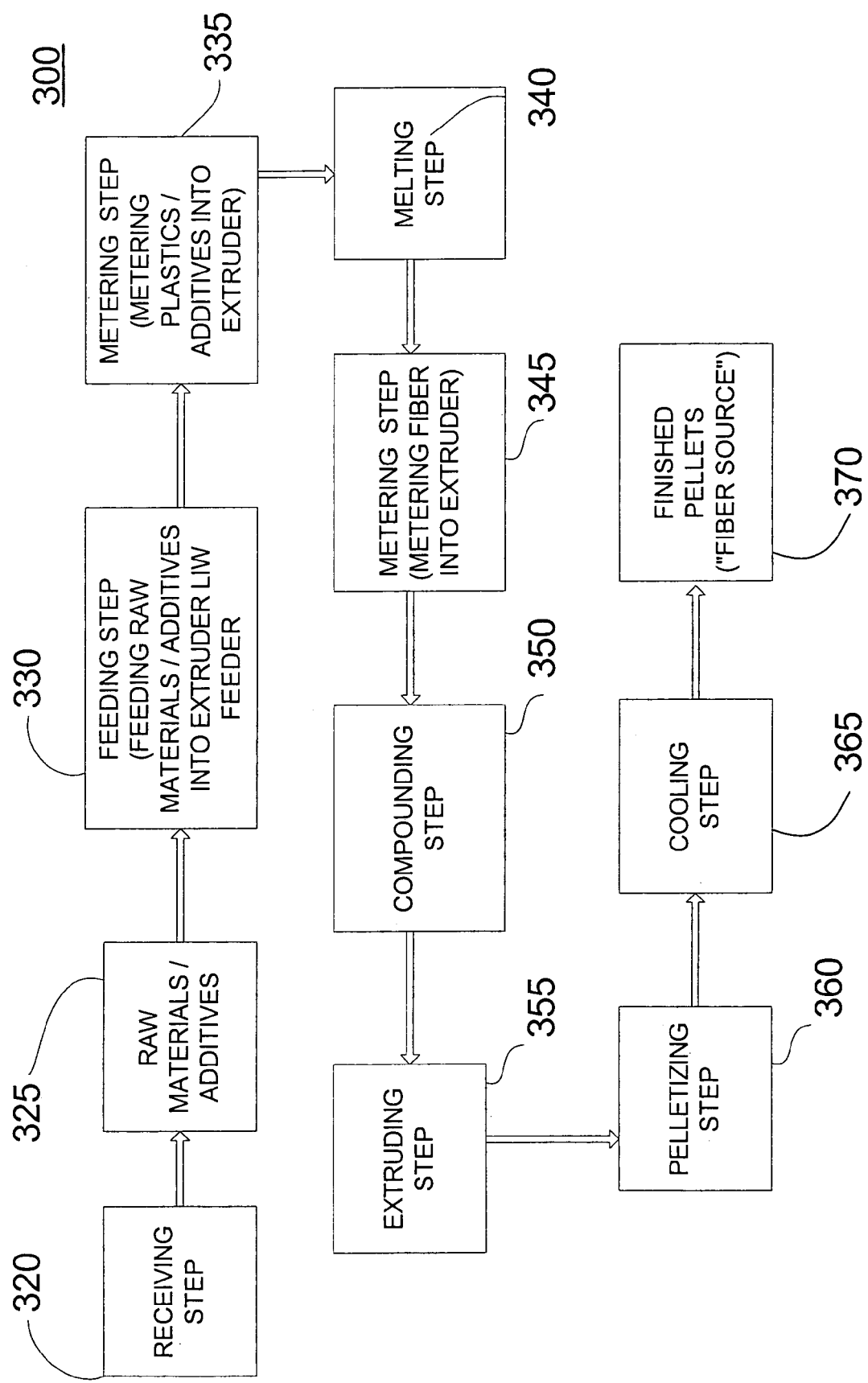
FIG. 7 is a flow diagram of a process used to form a polymer enhanced cellulose fiber based pellet, a preferred fiber source of the present invention.

The polymer enhanced fiber pellets or fiber source described above may be formed in accordance with the process 300 depicted in FIG. 7. In a first step 320, raw materials 325 to be metered into an extruder are received. The raw materials 325 consist of cellulose fiber pellets discussed above, plastics such as polyolefin resin (virgin or regrind with a MFR of between 25 and 35), and additives such as coupling agents and processing aids. Each of these ingredients is then fed, at step 330, into loss in weight (LIW) feeders for metering into the extruder. The LIW feeder can control the exact proportion of each ingredient as required by a recipe and defined by the rate. At step 335, the plastic and additives are preferably fed into the throat of the extruder. Next, at step 340, melting and mixing of the plastics and additives into a "melt" occurs in the first third of the length of the extruder, which is preferably a co-rotating twin-screw extruder. The fiber from the cellulose fiber pellets is then metered and injected into the extruder at step 345. The extruder, at step 350, then uses the remaining length to compound the fiber into the melt and create a homogenous composite melt.

The melt, in an extruding step at step 355, is then fed into an inline melt pump and forced through a pellet die creating strands that are cut off at step 360 at the die thus creating pellets. This process is termed hot face pelletizing. At step 365, the pellets are then transferred pneumatically, providing primary cooling, to a fluidized bed cooler where the plastic solidifies forming hard finished pellets 375, i.e., the fiber source.

While various preferred embodiments of the invention have been shown for purposes of illustration, it will be understood that those skilled in the art may make modifications thereof without departing from the true scope of the invention as set forth in the appended claims including equivalents thereof.

What is claimed is:

1. A shim comprising
a body having first and second faces, the body being molded from a mixture of plastics and cellulose fiber that deters splintering and splitting,
a plurality of grooves and ridges formed in the body along the first face, the body being cleanly breakable along a groove of the plurality of grooves, and
a rim extending about and above openings and tops of the plurality of grooves and ridges, wherein a top of the rim is in spaced relation with the openings and tops of the plurality of grooves and ridges.

2. The shim of claim 1 wherein the rim is contiguous about the perimeter of the first face.

3. The shim of claim 1 wherein the rim extends about the outer boundaries of the first face and wherein the top of the rim is in spaced relation with a surface of the first face.

4. The shim of claim 1 wherein the base of each groove of the plurality of grooves and ridges forms a break line.

5. The shim of claim 4 wherein the break lines are spaced apart at a predetermined distance.

6. The shim of claim 5 wherein the predetermined distance is about 3/16 inches.

7. The shim of claim 4 wherein the thickness of the body between a base of each groove of the plurality of grooves and ridges and the second face of the body is maintained at a constant thickness to maintain the force required to break the body along any of the grooves of the plurality of grooves and ridges at a constant level.

8. The shim of claim 7 wherein the mixture of plastics and fiber comprises plastic in a range of about 66% to 75% by weight and fiber in a range of about 22% to 29.5% by weight.

9. The shim of claim 8 wherein the mixture of plastics and fiber comprises plastic at about 71% by weight.

10. The shim of claim 8 wherein the mixture of plastics and fiber comprises fiber at about 25% by weight.

11. The shim of claim 7 wherein the plastics in the mixture of plastics and fiber includes polyolefin thermoplastics.

12. The shim of claim 11 wherein the polyolefin thermoplastics have a melt flow rate (MFR) of about 25 to 35 g/10 minutes.

13. The shim of claim 1 wherein the cellulose fiber is sourced from paper mill reject streams.

14. The shim of claim 13 wherein the cellulose fiber is sourced from an old corrugated cardboard waste stream of the paper mill reject streams.

15. The shim of claim 13 wherein the cellulous fiber and plastics are indigenous to the paper mill reject streams.

16. The shim of claim 1 wherein the body is deformable when bent and breakable along a groove of the plurality of grooves and ridges when the body is bent beyond a breaking point.

* * * * *